Patented Oct. 30, 1934

1,978,619

UNITED STATES PATENT OFFICE 1,978,619

PRODUCTION OF ACETONE FROM ETHYL ALCOHOL

Grover Bloomfield, Elkhorn, Wis., and Lloyd C. Swallen and Francis M. Crawford, Terre Haute, Ind., assignors to Commercial Solvents Corporation, Terre Haute, Ind., a corporation of Maryland No Drawing. Application May 18, 1929, Serial No. 364,318. Renewed January 6, 1934

17 Claims. (Cl. 260—134)

Our invention relates to a process of obtaining acetone from ethyl alcohol. More particularly, our invention relates to a process of obtaining acetone from ethyl alcohol at elevated temperatures and, preferably, reduced pressures in the presence of appropriate catalysts.

In the past, acetone has generally been obtained commercially by one or the other of two extensively used methods. In the dry distillation of hard woods, pyroligneous acid, containing among other substances, acetic acid, is obtained. Calcium acetate obtained by the neutralization of this acid is converted, in turn, into acetone by dry distillation. More recently, large quantities of acetone have been obtained as a by-product in the production of n-butyl alcohol by fermenting carbohydrates. Both of these processes present certain disadvantages from a commercial viewpoint which need not be presented here.

We are aware also of the fact that in the past, ketones have been made from secondary alcohols. Secondary alcohols undergo decomposition at a dull red heat, giving hydrocarbons by dehydration and ketones by dehydrogenation, the one or the other reaction predominating as the case may be. The transformation of secondary alcohols into ketones is even more readily accomplished by the aid of catalysts such as finely divided copper. Isopropyl alcohol is decomposed slowly from 150° C., the production of acetone being rapid at 250° to 430° C., without separation of propylene. Secondary butyl alcohol is attacked at 160° C. and furnishes butanone readily at 300° C. Similarly, secondary octyl alcohol yields octanone (2) and cyclohexanone may be obtained from cyclohexanol.

We have now made the discovery that acetone may also be obtained from ethyl alcohol by subjecting the latter to the action of elevated temperatures, preferably in the presence of catalysts. Examples of our preferred method of carrying out this new reaction will be described below.

One of the most efficient catalysts which we have tried is of the character disclosed in United States Patents Nos. 1,625,924, 1,625,925, 1,625,926, 1,625,927, 1,625,928, and 1,625,929, issued April 26, 1927, for use in the production of synthetic methanol. These catalysts initially comprise a plurality of difficultly reducible metal oxides, a plurality of easily reducible metal oxides, and a metallic halide, as for example, zinc oxide, iron oxide and zinc chloride.

Below will be found a description of the composition and method of preparing a number of catalysts suitable for use in our new process. It is distinctly understood, however, that these examples are cited merely as illustrative of the character of the catalyst mixture which we prefer to use and that we are in no way bound to the use of the examples cited. Many other combinations may also be satisfactorily employed in our process.

Example I 3500 grams of ferric nitrate are dissolved in 50 liters of water and sufficient ammonium hydroxide is added to precipitate all of the iron as ferric hydroxide. The flocculent mass is filtered and washed and to it is added 9 kilograms of zinc oxide, and the mixture is thoroughly stirred. The resultant pasty mass is allowed to dry and is then broken up into granules. To the granules is added a solution containing 1500 grams ferric chloride. The mass is again dried, whereupon it is ready for use.

Example II 8 kilograms of chromic nitrate $$(Cr(NO_3)_3.9H_2O)$$

are dissolved in 5 liters of water and 5 kilograms of zinc oxide added with stirring. The product thus obtained is evaporated to dryness and heated until the chromium nitrate is converted to chromic oxide. This material is then mixed with 10% of dextrin or a similar agglutinating agent and 6–10% of zinc chloride, dissolved in 10 parts of water. The mixture is then dried, broken up and sieved thru a 65 mesh screen.

Example III 160 grams chromium nitrate $(Cr(NO_3)_3.9H_2O)$ are dissolved, with heating, in 60 c. c. water. After the solution has cooled, 10 grams zinc chloride and 96 grams ferric nitrate are added. To the resulting cold solution, 100 grams zinc oxide are then added with constant stirring. The resulting wet mass is heated in a porcelain evaporating dish to dryness and then placed in a copper crucible in which it is heated over a Fletcher burner to drive off the nitrogen peroxide fumes. The material thus obtained is crushed sufficiently to pass a 65 mesh screen and to it 8.2 grams zinc chloride dissolved in 60 c. c. water are added. The product thus obtained hardens spontaneously.

When ethyl alcohol is passed at elevated temperature over suitable catalysts such as, for example, those described above, acetone is obtained together with certain other products, the character of which varies considerably depending upon the presence or absence of other materials with the ethyl alcohol being treated. We have found that in carrying out our new process it is not necessary that the ethyl alcohol be absolutely pure. Other substances which do not react with the ethyl alcohol or the acetone, or which do not react to form substances reacting in turn with these two compounds, may be present with the ethyl alcohol without producing appreciably harmful effects. In some cases, as will be seen hereafter, the presence of such materials may even produce beneficial results.

The catalytic conversion of ethyl alcohol to acetone is carried out with somewhat better results at pressures appreciably lower than atmospheric, than at ordinary pressures. Materials substantially inert under the conditions of the reaction may serve to lower the partial pressure of the ethyl alcohol being reacted, and thus accomplish the same result as if the reaction had been actually carried out under a partial vacuum.

The particular pressure to be employed in the conversion of ethyl alcohol to acetone depends to a large extent upon the economic considerations involved in the particular operation. For example, the pressure employed will depend upon the rate at which the alcohol is conducted over the catalyst, the volume of the catalyst, the character of the catalyst used, the reaction temperature, cost of raw materials, methods of recovering both the unconverted alcohol and the acetone formed during the reaction, and finally, the method adopted for attaining reduced pressure.

We may employ any of a number of methods of conducting the alcohol over the catalyst under reduced pressure. These methods are equally satisfactory from the point of view of the efficacy of the reaction and the particular one adopted for use will depend upon the facilities available to the operator or the particular needs of a certain process. We may, for example, create a partial vacuum in the reaction chamber and introduce the alcohol to be reacted at such a rate as to maintain the desired reduced pressure in the reaction zone. The acetone thus formed and the unconverted alcohol are continually removed and recovered by any convenient method such as by condensing or by any suitable adsorption or solvent recovery process.

Another convenient method of attaining the desired reduced pressure is by mixing the ethyl alcohol with a material, inert under the conditions of the reaction, in sufficient quantity to reduce the partial pressure of the ethyl alcohol to the desired degree. Materials which we have found to be especially suitable for this purpose are, for example, nitrogen gas, carbon dioxide gas, hydrogen gas, or the gaseous products formed during the reaction. In case it is desired to employ the vapors of an inert liquid compound as the means of obtaining the desired pressure, it is highly advisable that the material chosen be miscible with ethyl alcohol, and preferably, easily vaporized. The mixture of ethyl alcohol vapor and vapor of the inert material may be passed directly over the heated catalyst, or, preferably, thru a preheater and then thru the heated catalyst. More accurately regulated mixtures of alcohol vapor and inert vapor—resulting in more accurately regulated partial pressure of the ethyl alcohol—may be obtained by vaporizing the alcohol and inert material in different vessels and later mixing the desired quantities of vapors of the two substances. When an uncondensable gas or a material in which the acetone is not soluble, is employed as the means of reducing the partial pressure of the alcohol being treated or when the reaction is carried out at reduced pressures without the aid of a diluent material such as has been enumerated, it is usually necessary to pass the gases issuing from the reaction chamber thru a scrubbing or solvent recovery system of some kind for the purpose of recovering the acetone.

A convenient and economical method of attaining the desired reduced pressure is by using as the inert diluent the gaseous reaction products formed in the process. The required proportion of these gaseous products, after removal of the acetone, unconverted alcohol and any other condensable product that may be formed by side reactions, condensation, scrubbing or other suitable method, and supplemented by additional inert material, if necessary, is mixed with alcohol vapor and again passed over the catalyst. In this way, the process may be carried out in a cyclic manner, the required partial pressure of the alcohol being maintained by purging at intervals or continuously, a portion of the gaseous reaction products, or, if necessary, making additions of gaseous inert material from an auxiliary source of supply. The mass action effect of these gaseous reaction products employed as diluents is apparently small since the conversion of alcohol to acetone is only slightly reduced by their use.

After a number of days' use the catalyst begins to lose its efficiency and the rate of conversion of alcohol to acetone decreases appreciably. We have found, however, that the original efficiency of the catalyst may be easily and quickly restored. When the rate of conversion has decreased to a point beyond which the operation of the process is not economical, the operation may be stopped and the catalyst reactivated by passing over it oxygen or an oxygen-containing gas such as air, for a number of hours at temperatures of about 450° to about 600° C.

The table given below shows experimental results obtained with different catalysts and under different operating conditions.

| Alcohol | Catalyst | Grm. alcohol per c. c. of cat. per hr. | Temp. ° C. | Alcohol partial pressure mm. | Means of attaining partial pressure | Conversion to acetone* percent |
|---|---|---|---|---|---|---|
| Ethyl | #3 | 2.0 | 400 | | Ordinary pressure | 27.0 |
| Ethyl | #3 | 1.7 | 375 | | Ordinary pressure | 17.5 |
| Ethyl | #3 | 1.6 | 425 | | Ordinary pressure | 26.0 |
| Ethyl | #3 | .20 | 400 | 23 | Nitrogen | 57.0 |
| Ethyl | #3 | .12 | 450 | 23 | Nitrogen | 58.0 |
| Ethyl | #3 | .12 | 450 | 25 | Carbon dioxide | 56.0 |
| Ethyl | #3 | .15 | 450 | 38 | Gaseous reaction product. | 47.0 |
| Ethyl | #3 | .18 | 450 | 45 | Hydrogen | 51.0 |
| Ethyl | #3 | .12 | 450 | 60 | Vacuum (no diluent) | 35.0 |

*On basis of two mols of alcohol giving one mol of acetone.

The examples shown above are cited merely for the purpose of illustrating the varied conditions under which our new process may be satisfactorily operated and it is distinctly understood that we are not limited by any of the conditions therein stated.

The reaction may be carried out over a fairly wide range of temperatures, say from about 250° C. to about 650° C. We prefer, however, to employ temperatures ranging from about 400° C. to about 500° C. This factor, of course, may be varied considerably depending upon the other factors such as volume of catalyst, rate of flow of alcohol vapor, pressure employed, method of attaining the desired pressure, etc.

The pressure at which the reaction is effected may also be varied over a wide range provided the pressure of the alcohol undergoing reaction is maintained appreciably below atmospheric pressure. In general, the percentage of ethyl alcohol converted into acetone is increased as the pressure at which the reaction is carried out is decreased. We prefer to make use of pressures ranging from about 10 mm. to about 250 mm. (mercury), but it is understood, of course, that we are not limited to this particular range since other pressures below atmospheric are also conducive to the reaction even though lower conversions may be obtained; in the case of low pressures, higher conversions are obtained but the recovery of the products is somewhat more difficult. We claim generally the process of effecting the herein described process at reduced pressures and it is distinctly understood that we do not confine ourselves to any particular method of attaining the desired reduced pressures nor to any particular pressure. For example, we may either maintain a partial vacuum in the reaction vessel or we may attain the same result by diluting the alcohol vapor to be reacted with a sufficient amount of an inert material (under the conditions of the reaction) to reduce the partial pressure of the alcohol vapor to the desired degree. We prefer to make use of nitrogen or carbon dioxide gases for this purpose.

We have found that our new process may be satisfactorily carried out by the aid of a fairly wide variety of catalysts and while we prefer to employ catalysts of the character described in this specification, it is distinctly understood that we do not confine ourselves to the use of only such materials.

Now having described our invention, what we claim as new and novel is:

1. In a process in which ethyl alcohol is transformed primarily into acetone by the action of essentially heavy metal oxide catalysts in which the metal oxides are present in substantial excess by weight, the improvement which comprises passing through the reaction zone, at temperatures from 250° C. to 650° C., a gaseous mixture in which ethyl alcohol constitutes the only reactant present in substantial concentration and in which the partial vapor pressure of said ethyl alcohol is substantially lower than atmospheric.

2. In a process in which ethyl alcohol is transformed primarily into acetone by the action of essentially heavy metal oxide catalysts in which the metal oxides are present in subsantial excess by weight, the improvement which comprises passing through the reaction zone, at temperatures from 250° C. to 650° C., a gaseous mixture in which ethyl alcohol constitutes the only reactant present in substantial concentration and in which the partial vapor pressure of said ethyl alcohol is between 10 mm. and 250 mm. (mercury).

3. In a process in which ethyl alcohol is transformed primarily into acetone by the action of essentially heavy metal oxide catalysts in which the metal oxides are present in substantial excess by weight, the improvement which comprises passing through the reaction zone, at temperatures from 250° C. to 650° C. and at pressures substantially lower than atmospheric, vapors consisting of ethyl alcohol.

4. In the catalytic production of acetone from ethyl alcohol, the improvement which comprises passing through the reaction zone, at temperatures from 250° C. to 650° C. and at pressures from 10 mm. to 250 mm. (mercury), vapors consisting of ethyl alcohol.

5. In a process in which ethyl alcohol is transformed primarily into acetone by the action of essentially heavy metal oxide catalysts in which the metal oxides are present in substantial excess by weight, the improvement which comprises passing through the reaction zone, at temperatures from 250° C. to 650° C., a vapor mixture comprising ethyl alcohol and a vapor substantially inert under the conditions of the reaction, said mixture containing less than ½ mole of water per mole of ethyl alcohol.

6. In the catalytic production of acetone from ethyl alcohol, the improvement which comprises passing through the reaction zone, at temperatures from 250° C. to 650° C., a vapor mixture comprising ethyl alcohol and a vapor inert under the conditions of the reaction, the partial pressure of the said ethyl alcohol vapor in said mixture being from 10 mm. to 250 mm. (mercury) and said mixture containing less than ½ mole of water per mole of ethyl alcohol.

7. In a process in which ethyl alcohol is transformed primarily into acetone by the action of essentially heavy metal oxide catalysts in which the metal oxides are present in substantial excess by weight, the improvement which comprises passing through the reaction zone, at temperatures from 250° C. to 650° C., a vapor mixture comprising ethyl alcohol and a vapor inert under the conditions of the reaction, said mixture being substantially free from water.

8. In the catalytic production of acetone from ethyl alcohol, the improvement which comprises passing through the reaction zone, at temperatures from 250° C. to 650° C., a vapor mixture comprising ethyl alcohol and a vapor inert under the conditions of the reaction, the partial pressure of the said ethyl alcohol vapor in said mixture being from 10 mm. to 250 mm. (mercury) and said mixture being substantially free from water.

9. In a process in which ethyl alcohol is transformed primarily into acetone by the action of essentially heavy metal oxide catalysts in which the metal oxides are present in substantial excess by weight, the improvement which comprises passing through the reaction zone, at temperatures from 250° C. to 650° C., a vapor mixture consisting of ethyl alcohol and carbon dioxide.

10. In a process in which ethyl alcohol is transformed primarily into acetone by the action of essentially heavy metal oxide catalysts in which the metal oxides are present in substantial excess by weight, the improvement which comprises passing through the reaction zone, at temperatures from 250° C. to 650° C., a vapor mixture consisting of ethyl alcohol and nitrogen.

11. In a process in which ethyl alcohol is transformed primarily into acetone by the action of essentially heavy metal oxide catalysts in which the metal oxides are present in substantial excess by weight, the improvement which comprises passing through the reaction zone, at temperatures from 250° C. to 650° C., a vapor mixture consisting of ethyl alcohol and the gaseous products previously formed in the reaction.

12. A process for the production of acetone which comprises subjecting to the action of catalysts initially comprising essentially a mixture of easily-reducible and difficultly-reducible metal oxides and a metal halide, at temperatures from 250° C. to 650° C., a gaseous mixture in which ethyl alcohol constitutes the only reactant present in substantial concentration and in which the partial vapor pressure of said ethyl alcohol is substantially lower than atmospheric.

13. A process for the production of acetone which comprises subjecting to the action of catalysts initially comprising essentially a mixture of easily-reducible and difficultly-reducible metal oxides and a metal halide, at temperatures from 250° C. to 650° C., a gaseous mixture in which ethyl alcohol constitutes the only reactant present in substantial concentration and in which the partial vapor pressure of said ethyl alcohol is between 10 mm. and 250 mm. (mercury).

14. A process for the production of acetone which comprises subjecting to the action of catalysts initially comprising essentially a mixture of easily-reducible and difficultly-reducible metal oxides and a metal halide, at temperatures from 250° C. to 650° C. and at pressures substantially lower than atmospheric, vapors consisting of ethyl alcohol.

15. A process for the production of acetone which comprises subjecting to the action of catalysts initially comprising essentially a mixture of easily-reducible and difficultly-reducible metal oxides and a metal halide, at temperatures from 250° C. to 650° C., a vapor mixture comprising ethyl alcohol and a vapor substantially inert under the conditions of the reaction, said mixture containing less than ½ mole of water per mole of ethyl alcohol.

16. A process for the production of acetone which comprises subjecting to the action of catalysts initially comprising essentially a mixture of easily-reducible and difficultly-reducible metal oxides and a metal halide, at temperatures from 250° C. to 650° C., a vapor mixture comprising ethyl alcohol and a vapor inert under the conditions of the reaction, said mixture being substantially free from water.

17. A process for the production of acetone which comprises subjecting to the action of catalysts initially comprising essentially a mixture of easily-reducible and difficultly-reducible metal oxides and a metal halide, at temperatures from 250° C. to 650° C., a vapor mixture consisting of ethyl alcohol and the gaseous products previously formed in the reaction.

GROVER BLOOMFIELD.
LLOYD C. SWALLEN.
FRANCIS M. CRAWFORD.